Dec. 9, 1941.  C. T. DONNELLY  2,265,421
REVOLVING AND LIFTING BROILER FOR COOKING STOVES
Filed June 18, 1940
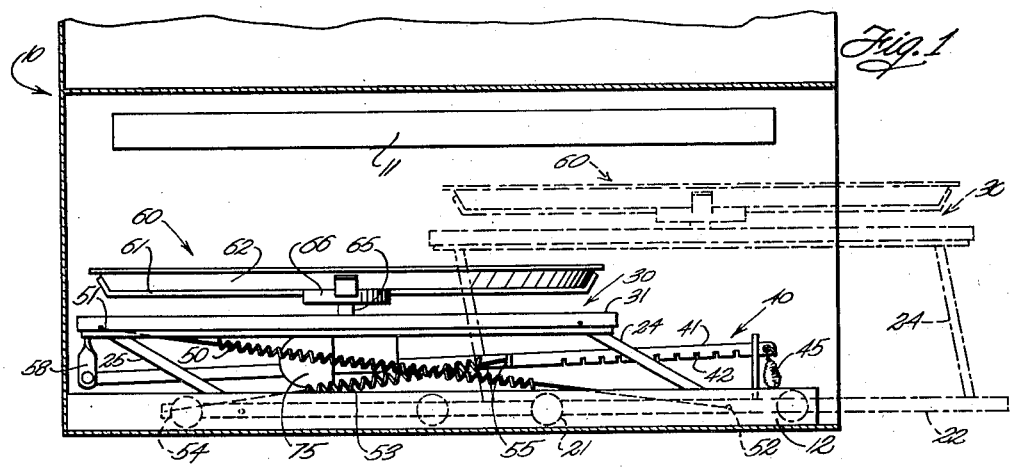
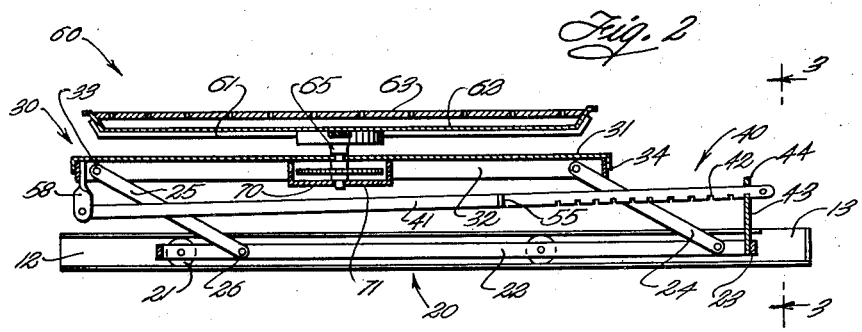
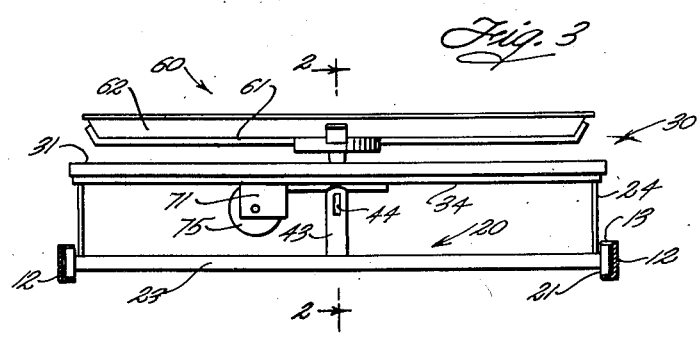
Inventor
CHARLES T. DONNELLY
By Hazard & Miller
Attorneys Patented Dec. 9, 1941

2,265,421

UNITED STATES PATENT OFFICE 2,265,421

REVOLVING AND LIFTING BROILER FOR COOKING STOVES

Charles T. Donnelly, Los Angeles, Calif.

Application June 18, 1940, Serial No. 341,136

4 Claims. (Cl. 126—41)

In domestic cooking stoves attempts have been made to develop grills for cooking meats or the like located below a source of heat as a heating unit such as gas burners or electric heating elements. In this type of cooking it is much preferable to have the broiling done by the action of radiant heat rather than heat of conduction or convection. Where the meat or other food product being broiled is left stationary in reference to the heating unit, it has been difficult to obtain even cooking.

It has long been the custom to broil and barbecue meat, fowl, etc., on a rotatable spit positioned either contiguous to a source of heat such as at one side or above the same and in this the rotating action gives a uniform exposure of the article on the spit to the source of heat giving the desired penetration of the heat and action of cooking. Hence a main object and feature of my invention is to apply in a sense this same type of rotational cooking in a broiling cooker in which the source of heat is located above a grill and the grill is rotated on a vertical axis. This so shifts the meat or other product being cooked giving a more uniform exposure to the heat and with much less trouble than the stationary broiler. Considered in more detail, a further object and feature of my invention is the employment of a platform which may be more or less insulated as to the heat and having a grill rotatably mounted on a vertical axle, this axle being supported by the platform and in which the power for rotation is located below the heat insulated platform. This enables the employment of an electric motor to rotate the shaft and hence the grill. Various other details include the use of a frame on the upper end of the shaft and the grill being disconnectibly placed on the frame, thus allowing ready removal for cleaning and replacing.

In view of the fact that in cooking meat or the like by broiling when using an overhead source of heat it is necessary to raise or lower the grill, my invention also comprehends a device and construction for this purpose, this device utilizing a parallel motion type of links connecting the platform and a lower structure with assistance springs to aid in raising the platform and with counteracting springs to allow shifting of the platform outwardly to facilitate placing the food on the grill and inspection of same. In this connection my invention also comprehends the use of a traveling carriage with wheels guided in tracks and a platform connected to the wheel chassis by the parallel links, the raising and lowering device including an adjusting rod. By this construction the carriage may be shifted towards the front or back of the stove, the platform and grill raised and lowered, the platform caused to project beyond the front of the stove and thus shift the grill for convenient handling and inspection of the food.

My invention is illustrated in connection with the accompanying drawing, in which:

Fig. 1 is a vertical section of the grill portion of a stove illustrating my invention in side elevation.

Fig. 2 is a vertical longitudinal section through my invention taken on substantially the section line 2—2 of Fig. 3 in the direction of the arrows with certain central parts shown in elevation, the springs and motor being omitted.

Fig. 3 is a vertical section on the transverse line 3—3 of Fig. 2 in the direction of the arrows, the springs and motor being omitted.

In this construction a conventional portion of a cooking stove is indicated by the numeral 10 having the overhead or upper heating unit 11 illustrated as a gas burner but this may be electric or other type. A fixed U shape track 12 is located in the stove, there being two of these facing in opposite directions, this track having upper and lower flanges with an opening 13 at the front of the flanges allowing removal of a carriage. This carriage 20 has wheels 21 operating in the guide tracks and is illustrated as having longitudinal rails 22 with transverse connecting bars 23. Two pairs of parallel links, a forward and a rearward pair, 24 and 25, are pivotally connected as at 26 to the side bars 22 of the carriage. These extend upwardly and connect to a platform assembly 30. This platform has a closed top 31 and side flanges 32 to which the links are connected by pivots 33. There is thus produced a parallel motion structure, the links being of equal length between the carriage and the platform. The platform is illustrated as removable from and supported by the longitudinal flanges 32 and the transverse flanges 34. The adjusting assembly 40 includes a pull bar or rod 41 which has a series of transverse notches 42 on its lower edge which engage in an anchor plate 43 extending upwardly from the transverse bar 23 at the front. The notches fit in a slit 44 in the upper edge of this plate, this forming a guide for the bar. A heat disseminating knob 45 attached to the rod is used for pulling this. A set of assistance springs 50 are connected between the rear portion of the platform 51 and the lower portion of the carriage indicated at 52. Another pair or set of reaction springs 53 are connected between the rear portion 54 of the carriage and a lug 55 on the pull rod 41.

In Fig. 2 the platform is shown in a lowered position as is also the case in Fig. 1 in full lines, therefore by pulling on the rod 41 which is attached by a bracket 58 to the rear end of the platform, this may be shifted upwardly to a position shown by broken lines in Fig. 1. At the same time if desired the carriage may roll forwardly on wheels 21 until these reach the forward end of the track. A further movement past the vertical position of links 24 and 25 shifts these with an outward inclination and thus positions the platform further out of the stove or broiler portion thereof than shown in Fig. 1. In this action of shifting the platform up and down the springs 50 assist the pulling action on the rod 41 until the links are in substantially vertical position. Then as the spring is shortened the pull is less. The spring 53 acts against the pull on the rod 41 and tends to resist the movement of the links past the vertical which as above mentioned, shifts the platform to its extreme forward and outward position.

The rotary grill assembly 60 includes a metal frame 61 which may have radial arms upwardly bent on which is placed a pan 62 with the grill plate 63 on the pan. From the frame 61 a shaft 65 extends downwardly, this being connected to a hub structure 66 at the center of the frame 61. The shaft is journalled in any suitable manner on the platform 31 and through means of a suitable gear train designated 70, located in a housing 71, the shaft and hence the grill is rotated, the power being derived from an electric motor 75 illustrated as mounted on the bottom of the platform 30. Through a reduction gear drive the grill operating in the manner of a turntable is rotated slowly compared with the speed of the motor. The motor has suitable electric wiring and leads connected preferably to plugs or sockets attached to the stove and in some place in the circuit a suitable switch is located. It will be noted that the motor is located below the platform 30 which is preferably heat insulated to protect the motor from the heat from the heating unit 11.

It will be seen by this construction therefore that the vertical shaft 65 is rotated by the motor and this in its turn rotates the frame 61, this being part of the grill, therefore meat or other food placed on the grill plate 63 is rotated underneath the heating unit 11 on the axis of the shaft 65. In view of the fact that the grill may be raised and lowered, this can be positioned either close to or remote from the heating element. When the carriage is pulled outwardly it is quite a simple matter to place the material to be cooked on the grill, then run the carriage backwardly on its tracks, adjust the platform to the desired elevation, the grill and hence the material being cooked may then be rotated slowly on a vertical axis. On account of the continuous shifting position in reference to the heating unit, a uniform and thorough cooking is obtained.

Various changes may be made in the details of the construction without departing from the spirit or scope of the invention as defined by the appended claims.

I claim:

1. In a broiler having a heating unit, a platform positioned therebelow, a grill on said platform, parallel tracks below the heating unit, a carriage having wheels mounted in the tracks, pairs of parallel links connecting the forward and rearward portions of the carriage and platform respectively, a first spring connecting the rear portion of the platform and the front portion of the carriage, a pull rod having a pivotal connecting means to the rear portion of the platform and an adjustable connection to the front portion of the carriage and a second tension retracting spring between the rear portion of the carriage and the said pull rod.

2. In a stove, an oven having an opening at the front, a horizontal heater in the upper portion of the oven, a carriage, means to guide the carriage in a movement towards the open front and the back of the oven, a platform having a closed top adjustably mounted on the carriage to vary the distance of the platform from the heater, an electric motor mounted on the underside of the platform, a vertical shaft extending through the platform, a drive connection from the motor to said shaft, a grill frame connected to the upper end of the shaft having a grill plate thereon, whereby the said plate is vertically adjustable and rotatable in a plane parallel to the heater.

3. In a cooking stove, a pair of guide tracks, a broiler heating element above the tracks, a carriage movable on the guide tracks, a platform on the carriage, a pair of parallel links connecting the platform and the carriage, means to change the angularity of the links with respect to the tracks and thus raise and lower the platform, a grill and means rotatably mounting the grill on the platform for rotation about a vertical axis, whereby the grill may be raised and lowered with reference to the heating element and rotated with reference to the same heating element and below the same.

4. In a cooking stove having an oven open at the front, a horizontal heater at the top of the oven, a longitudinal guide means between the open front and the back of the oven, a carriage horizontally slidable in said guide means, a platform adjustably mounted on the carriage for raising and lowering movements and to extend at least part of the platform outside of the open front of the oven, a motor mounted on the underside of the platform, a vertical shaft extending through the platform and having a drive connection to the motor, a grill frame connected to the shaft and having a horizontal grill plate mounted thereon, the grill plate thereby rotating in planes parallel to the heater and at variable distances therefrom, the shaft and grill plate being mounted on the platform in such a position that a portion of the grill plate may be extended through the open front of the oven.

CHARLES T. DONNELLY.